United States Patent [19]

Seckerson

[11] 3,776,092
[45] Dec. 4, 1973

[54] FASTENER
[75] Inventor: Clifford A. Seckerson, Iver Heath, England
[73] Assignee: TRW Inc., Cleveland, Ohio
[22] Filed: Dec. 16, 1971
[21] Appl. No.: 208,723

[30] Foreign Application Priority Data
Dec. 23, 1970 Great Britain.................... 6,113/70

[52] U.S. Cl. ................................ 85/5 R, 24/73 HS
[51] Int. Cl. ...................... F16b 13/04, F16b 19/00
[58] Field of Search .............................. 85/5 R, 80; 24/73 PF, 73 HS, 208 A, 213 R; 248/71

[56] References Cited
UNITED STATES PATENTS
| | | | |
|---|---|---|---|
| 3,093,874 | 6/1963 | Rapata | 85/5 R X |
| 3,485,133 | 12/1969 | Rapata | 85/5 R |
| 3,550,217 | 12/1970 | Collyer | 85/5 R X |
| 3,678,797 | 7/1972 | Seckerson | 85/5 R |

FOREIGN PATENTS OR APPLICATIONS
1,060,079  2/1967  Great Britain.................... 24/73 HS

*Primary Examiner*—Ramon S. Britts
*Attorney*—Philip E. Parker et al.

[57] ABSTRACT

A resilient synthetic plastics fastener having a head and a shank extending outwardly from the undersurface of the head and comprising a longitudinal stem and two longitudinal flanges lying one on each side of the stem. The flanges are joined to the stem by resilient webs and are compressible inwardly of the shank towards the stem. Each flange has a longitudinal edge remote from the web and an outer surface which comprises a longitudinal operative face adjacent the said edge and a longitudinal inoperative face between the operative face and the web. The operative face of each flange is convexly curved in section and is adapted to engage the rim of a circular aperture when the shank is inserted through the aperture and the inoperative face is adapted to clear the rim of the aperture so as to substantially reduce the area of interference between the flanges and the rim of the aperture.

8 Claims, 5 Drawing Figures

PATENTED DEC 4 1973  3,776,092

FASTENER

BACKGROUND TO THE INVENTION

The present invention relates to a resilient fastener of the type having a head and a shank for insertion through an aperture in a panel.

It is known to provide a resilient fastener comprising a head and a shank which is formed with three longitudinally extending recesses, one opening out of one side of the shank in the plane of the axis of the shank and the other two recesses being positioned adjacent the first recess and opening out of the other side of the shank. On a transverse section the shank is thus W-shaped and the recesses render the shank compressible, in a plane perpendicular to the longitudinal axis of the shank in a concertina fashion so that it can be readily inserted into a circular aperture.

This known type of fastener has the disadvantage that under certain, though not all, working conditions as the shank of the fastener is forced through a circular aperture there is a tendency for the shank to bind on the rim of the aperture.

It is an object of the present invention to provide a fastener which eliminates, or at least substantially reduces this disadvantage.

STATEMENT OF THE INVENTION

According to one aspect of the present invention there is provided a fastener comprising a head having an undersurface and a shank which extends outwardly from the undersurface of the head and which is adapted for insertion through a circular aperture in a panel, the shank comprising a longitudinally extending central stem and two longitudinally extending flanges lying on opposite sides of the stem and joined to the stem by resilient webs so as to be resiliently compressible inwardly of the shank and towards the stem, each flange having a longitudinal edge remote from the web and an outer surface comprising a longitudinally extending operative face adjacent the longitudinal edge which, on any transverse section through the flange is convexly curved and adapted to engage the rim of the circular aperture as the shank of the fastener is passed therethrough and wherein a longitudinally extending inoperative face is provided on each flange between the said operative face and the web which inoperative face is adapted to clear the rim of the circular aperture as the shank of the fastener is passed therethrough.

By curving only a part of the outer surface of each flange the area of the flange which engages the rim of the aperture when the shank is inserted therein is reduced and the risk of the shank binding on the rim of the aperture is eliminated or substantially reduced.

DESCRIPTION OF THE PREFERRED EMBODIMENT

Figure 1:
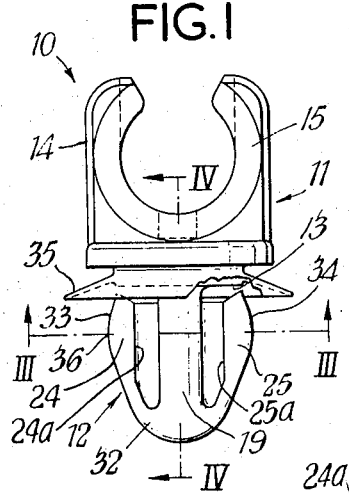
FIG. 1 is an elevation of a fastener according to the present invention.
Figure 2:
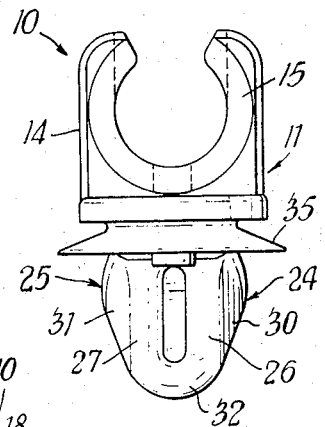
FIG. 2 is a rear elevation of the fastener of FIG. 1.

In the drawings, a resilient fastener is indicated generally at 10 which is manufactured by any conventional manner, for instance by injection moulding, from a suitable synthetic resin such as an acetal resin.

The fastener 10 comprises a head 11 and a shank 12 which projects normally from an undersurface 13 of the head 11.

Figure 5:
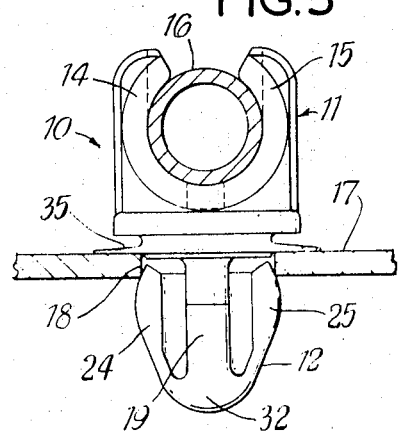
FIG. 5 is an elevation showing the fastener of FIG. 1 attaching a cable to an apertured panel.

The head 11 of the fastener is formed with two upstanding arms 14 and 15 which are adapted to grip a cable and the fastener 10 is shown in FIG. 5 attaching a cable 16 to a panel 17 which is formed with a circular aperture 18 to receive the shank 12 of the fastener. The shape and function of the head 11 of the fastener does not form a part of the present invention and it will be understood that the head of the fastener can be modified to suit different applications, for instance it can be formed as a button head or it can be adapted, in a well known manner, to engage a decorative moulding.

The shank 12 which extends from the undersurface 13 of the head 11 comprises a longitudinally extending central stem 19 which is U-shaped on any transverse section therethrough and which thus has generally parallel side walls 20 and 21, which are joined by a curved resilient portion 22. Adjacent the head 11, the stem 19 of the shank is formed with a solid abutment 23, positioned above and projecting outwardly of the gap between the side walls 20 and 21, as best seen from FIG. 4.

Positioned one on each side of the central portion 19 are two longitudinally extending flanges 24 and 25 which are joined to the walls 20 and 21 respectively by flexible webs 26 and 27. The outer surfaces of the flanges 24 and 25 each comprises a longitudinally extending operative face 28 and 29 respectively and a longitudinally extending inoperative face 30 and 31 respectively. The operative faces 28 and 29 are each curved on any transverse section therethrough on a radius approximately equal to the radius of the aperture 18 and the inoperative faces 30 and 31 are substantially flat. The operative faces 28 and 29 extend up to longitudinal edges 24a and 25a of the flanges 24 and 25 and the inoperative faces 30 and 31 extend from the operative faces 28 and 29 to the webs 26 and 27 which join the flanges to the stem 19.

The flanges 24 and 25 and the stem 16 terminate at the end of the shank remote from the head in a solid tapered tip 32. The flanges 24 and 25 diverge outwardly away from the head to form shoulders 33 and 34 adjacent the head and thereafter converge towards the tapered tip 32.

Figure 3:
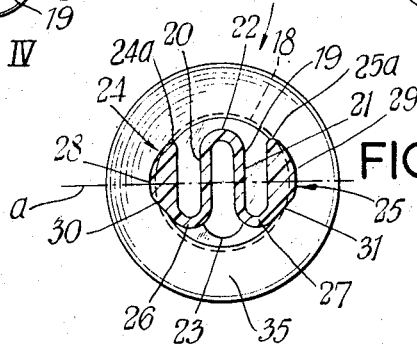
FIG. 3 is a section taken on the line III—III of FIG. 1.

As seen best from FIG. 3, the shank 12 is compressible, in a concertina fashion, along the line $a$ which is perpendicular to the walls 20 and 21 of the stem 19. When the shank 12 is inserted into the aperture 18, the dimension of which is indicated in broken line in FIG. 3, the tip 32 initially provides a lead in for the shank. The rim of the aperture 18 then engages the curved operative faces 28 and 29 of the flanges, thereby compressing the flanges inwardly. When the flanges 24 and 25 are compressed inwardly the webs 26 and 27 bend as does also the portion 22 of the stem 19 to achieve a concertina effect. During insertion of the shank into the aperture 18 only the curved operative faces 28 and 29 of the shank contact the rim of the aperture and since the curved operative faces 28 and 29 in combination contact less than one half of the periphery of the aperture there is little danger of the shank binding as it is inserted. Finally, the shoulders 33 and 34 pass through the aperture and locate behind the panel 17 to secure the fastener in the aperture.

The abutment 23 locates in the aperture 18 and co-operates with the portion 22 of the stem 19 to limit movement of the shank 12 in the aperture in a direction perpendicular to the direction a when the shank is pressed fully home through the aperture.

The head of the fastener 10 is formed with a resilient frusto-conical skirt 35, which surrounds the undersurface 13 of the head and the adjacent portion of the shank, and which bears against the outer surface of the panel 17 when the shank is pressed fully home. The skirt 35 is sufficiently resilient to form an effective seal around the aperture 18 and co-operates with the shoulders 33 and 34 to provide an effective clamping action on the panel.

Figure 4:
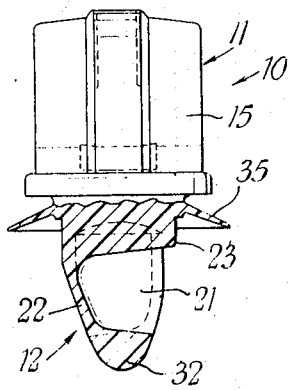
FIG. 4 is a section taken on the line IV—IV of FIG. 1.

As can be seen from FIGS. 1 and 4 the stem 19 of the shank is joined to the head 11 whereas the flanges 24 and 25 terminate short of the head and are free at their upper ends. This increases the range of movement of the flanges in the region of the shoulders 33 and 34 but is not essential and if less flexibility is required then the flanges can be joined integrally to the head.

Further minor modifications can be made to the above described embodiment without departing from the spirit and scope of the invention which is best described in the following claims.

What we claim is:

1. A fastener comprising a head having an undersurface and a shank which extends outwardly from the undersurface of the head and which is adapted for insertion through a circular aperture in a panel, the shank comprising a longitudinally extending central stem which is approximately U-shaped on any transverse section therethrough and includes two longitudinally extending walls lying in parallel planes and joined by a resilient web at one end thereof so as to be resiliently compressible towards one another and two longitudinally extending flanges lying on opposite sides of the stem and joined to the stem by resilient webs disposed at the same end of the stem, said end being the end of the stem most remote from the web of the stem, so as to be resiliently compressible inwardly of the shank towards the stem, each flange having a free longitudinal edge adjacent the web of the stem, a first outer surface comprising a longitudinally extending operative face adjacent the longitudinal edge which, on any transverse section through the flange is convexly curved and adapted to engage the rim of the circular aperture as the shank of the fastener is passed therethrough, and a second outer surface comprising a longitudinally extending inoperative face, said inoperative face being disposed between the operative face and the adjacent web joining the flange to the stem, the inoperative face being adapted to clear the rim of the circular aperture as the shank of the fastener is passed therethrough.

2. A fastener as claimed in claim 1, wherein the said operative faces extend in combination over less than 180° of an imaginary circle circumscribing the shank.

3. A fastener as claimed in 2, wherein the inoperative faces of the flanges are substantially flat.

4. A fastener as claimed in claim 3, wherein the stem and the flanges terminate at the end of the shank remote from the head in a solid tapered tip.

5. A fastener as claimed in claim 4, wherein the stem of the shank is joined to the head and the flanges terminate short of the head.

6. A fastener as claimed in claim 1, wherein the operative faces of the flanges are compressible towards one another in a direction substantially normal to the planes of the walls of the stem.

7. A fastener as claimed in claim 6, wherein the operative faces of the flanges diverge outwardly from the head to form two shoulders on opposite sides of the shank and converge from the shoulders towards the end of the shank remote from the head.

8. A fastener as claimed in claim 7, wherein the stem has a portion adjacent the head which is solid and which constitutes an abutment adapted to limit movement of the shank when the shank is engaged in the aperture.

* * * * *